(12) United States Patent
Chakravarty et al.

(10) Patent No.: US 8,018,432 B1
(45) Date of Patent: Sep. 13, 2011

(54) USER INTERFACES AND METHODS TO SEARCH CONTENT IN A NONLINEARLY CONVERGENT MANNER

(75) Inventors: Abhinav Chakravarty, Noida (IN); Mayank Kumar, Gurgaon (IN)

(73) Assignee: Adobe Systems Incorporated, San Jose, CA (US)

( * ) Notice: Subject to any disclaimer, the term of this patent is extended or adjusted under 35 U.S.C. 154(b) by 1178 days.

(21) Appl. No.: 11/788,604

(22) Filed: Apr. 20, 2007

(51) Int. Cl.
*G09G 5/00* (2006.01)
(52) U.S. Cl. .......................... 345/156; 345/684; 715/787
(58) Field of Classification Search .................. 345/156, 345/169, 684; 715/700, 716, 784–787, 810, 715/817, 830, 833
See application file for complete search history.

(56) References Cited

U.S. PATENT DOCUMENTS

| | | | |
|---|---|---|---|
| 5,828,370 A | 10/1998 | Moeller et al. | |
| 5,903,264 A | 5/1999 | Moeller et al. | |
| 6,038,614 A * | 3/2000 | Chan et al. | 710/1 |
| 7,421,654 B2 * | 9/2008 | Wugoski | 715/704 |
| 7,652,660 B2 * | 1/2010 | Chen et al. | 345/156 |
| 7,797,643 B1 * | 9/2010 | Jobs et al. | 715/815 |
| 2003/0126130 A1 * | 7/2003 | Martino et al. | 707/7 |
| 2003/0145284 A1 * | 7/2003 | Fortenberry et al. | 715/517 |
| 2006/0280051 A1 | 12/2006 | Petrella | |
| 2007/0035511 A1 * | 2/2007 | Banerjee et al. | 345/156 |
| 2007/0050732 A1 | 3/2007 | Chapman, Jr. | |
| 2007/0060218 A1 * | 3/2007 | Tak | 455/575.3 |
| 2007/0075984 A1 | 4/2007 | Chiu et al. | |
| 2007/0083823 A1 | 4/2007 | Jaeger | |

* cited by examiner

*Primary Examiner* — Kimnhung Nguyen
(74) *Attorney, Agent, or Firm* — Robert C. Kowert; Meyertons, Hood, Kivlin, Kowert & Goetzel, P.C.

(57) ABSTRACT

Embodiments of the invention relate generally to computing devices and systems, software, computer programs, applications, and user interfaces, and more particularly, to nonlinearly searching content in a manner that, for example, converges on a target unit of content.

14 Claims, 12 Drawing Sheets

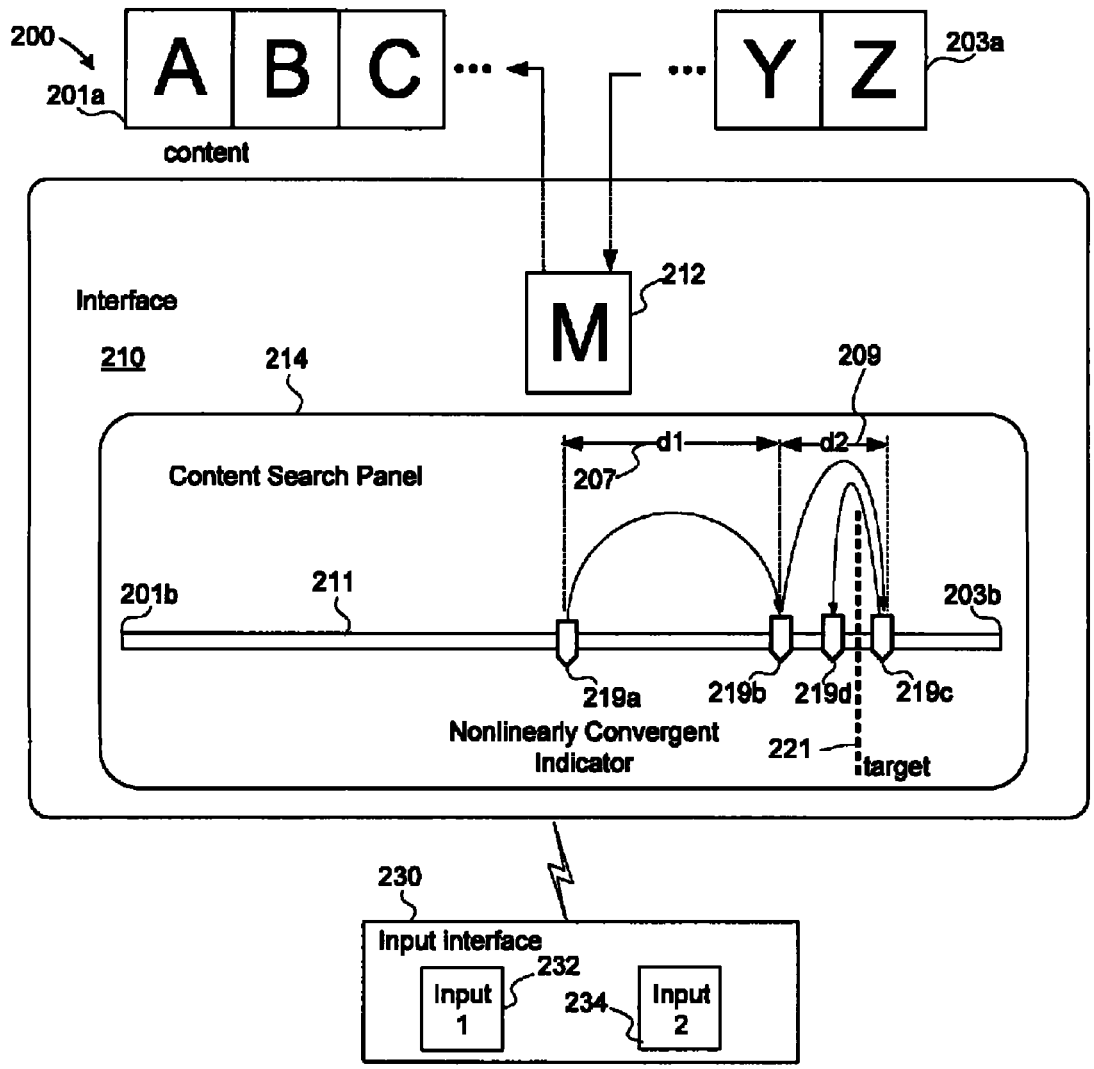
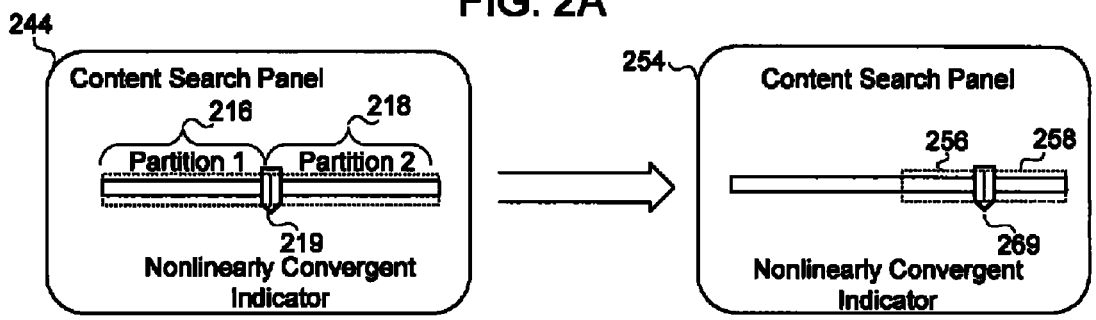
FIG. 2A
FIG. 2B

USER INTERFACES AND METHODS TO SEARCH CONTENT IN A NONLINEARLY CONVERGENT MANNER

FIELD OF THE INVENTION

Embodiments of the invention relate generally to computing devices and systems, software, computer programs, applications, and user interfaces, and more particularly, to nonlinearly searching content in a manner that, for example, converges on a target unit of content.

BACKGROUND OF THE INVENTION

Traditional user interfaces typically provide users with search tools to navigate through content, examples of which include scroll bars and sliders. Word processing applications usually provide scroll bars to control the viewing of a document by causing displayed text or graphics to move up, down, or across the display. Media players commonly provide a slider to enable a user to access different playback portions of a multimedia file. Generally, these search tools enable a user to traverse through content at a rate that is relatively proportional to the physical actions of the user. While functional, there are certain drawbacks to current techniques for navigating through content.

FIG. 1A depicts the use of a common pointing device used to navigate through content. As shown, a media player 102 is designed to display content 104 in response to control inputs 120, which can include a play input and a stop input. Further, media player 102 includes a slider 112 configured to move relative to a scale 110, which can represent a time scale. Slider 112, therefore, can select a playback portion anywhere from the beginning to the end of content 104. A user typically uses a pointing cursor ("pointer") 130 to select and drag slider 112 along scale 110 at a linear rate proportional to, for example, the movement of a mouse (or the length of time a pointing stick is activated). One drawback is that pointing device input 132 is a relatively sophisticated input device that senses motion and provides inputs representing movement in two-dimensional space (e.g., X and Y coordinates). One example of pointing device input 132 is a mouse. Another drawback is that not all hardware platforms implement pointing device input 132, such as devices having relatively small interfaces, including mobile phones, personal digital assistants ("PDAs"), and DVD-player remote controllers. Still yet another drawback is that pointing device input 132 requires additional time and effort relative to using, for example, one or more keys of a keyboard.

FIG. 1B depicts the use of a button device to navigate through content. As shown, a media player 152 includes a slider 162 configured to move relative to a scale 160, which represents a playback portion of content 154. Here, a user typically uses slider key 170 to incrementally move slider 162. Note that, as shown, the activation of slider key 170 causes slider 162 to move an incremental distance, "I," to position 164, with a subsequent activation of slider key 170 causing slider 162 to again move an incremental distance, "I," to subsequent position 166. Increment distance, "I," typically represents a discrete value, such as 1 to 5 seconds. Examples of slider key 170 include a left arrow and/or right arrow key of a keyboard. One drawback of slider key 170 is that a user is usually required to either activate slider key 170 numerous times or hold slider key 170 for an amount of time to step through earlier portions of content 154 to reach the latter portions.

It would be desirable to provide improved techniques, systems and devices that minimize one or more of the drawbacks associated with conventional techniques for searching content.

BRIEF DESCRIPTION OF THE FIGURES

The invention and its various embodiments are more fully appreciated in connection with the following detailed description taken in conjunction with the accompanying drawings, in which:

FIG. 2A is a diagram of an interface implementing a nonlinearly convergent indicator to search for content, according to at least one embodiment of the invention;

FIG. 2B is a diagram depicting partitions in conjunction with a nonlinearly convergent indicator, according to at least one embodiment of the invention;

Like reference numerals refer to corresponding parts throughout the several views of the drawings. Note that most of the reference numerals include one or two left-most digits that generally identify the figure that first introduces that reference number.

DETAILED DESCRIPTION

Figure 1A:
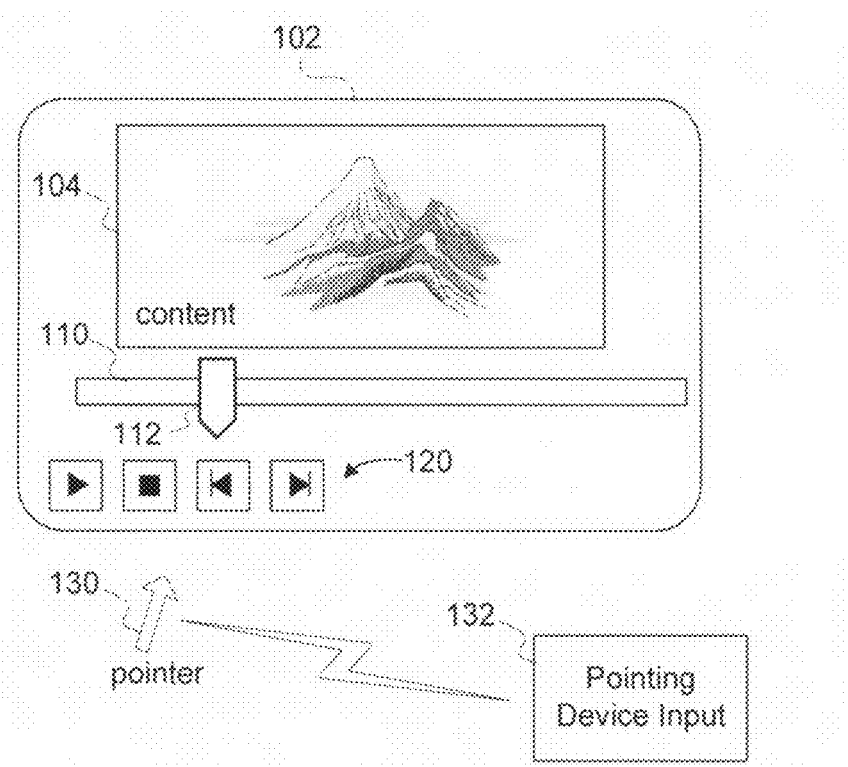
FIGS. 1A and 1B depict the use of conventional pointing and button devices to navigate through content.
Figure 1B:
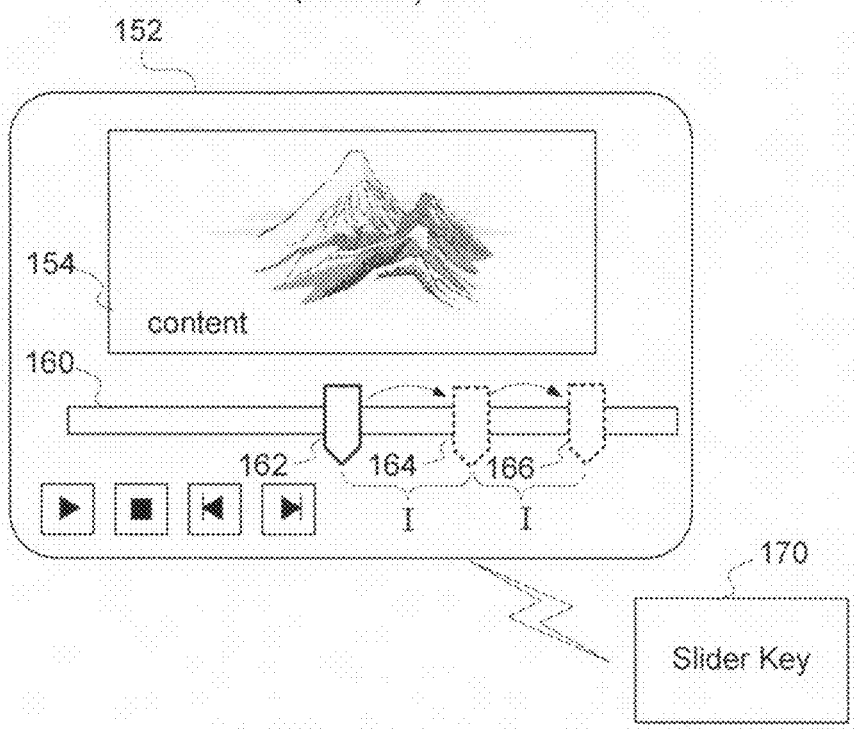

FIG. 2A is a diagram of an interface implementing a nonlinearly convergent indicator to search for content, according to at least one embodiment of the invention. Interface 210 is configured to provide a content search panel 214 for searching content 200 to determine, for example, a search result representative of a target portion of content, such as content portion 212. Further, input interface 230 is configured to implement a number of inputs that cause—in whole or in part—displacement of nonlinearly convergent indicator 219 to positions that correspond to portions of content 200. In one embodiment, content search panel 214 operates to displace nonlinearly convergent indicator 219 in decreasing magnitudes of displacements. The reductions in the magnitudes of displacements can be responsive—in whole or in part—to a user input, such as an input to select either input ("1") 232 or input ("2") 234. As such, a user can enter data or a datum into inputs 232 and 234 that generate non-linear amounts (i.e., magnitudes) of displacement. Nonlinearly convergent indicator 219, therefore, enables a user to determine a target content unit, as a search result from content 200, in accordance with a nonlinear function that causes nonlinearly convergent indicator 219 to converge at or near the target content unit at target position 221. Thus, nonlinearly convergent indicator 219 enables a user to initially implement relatively large displacements from one portion of content to the next portion, with subsequent decreases in the magnitudes of displacements that converge upon a targeted search result.

In view of the foregoing, nonlinearly convergent indicator 219 can exponentially reduce the number of inputs 232 and 234, which, in turn, enables a user to determine a target unit of content in less time than, for example, the implementation of a constant, incremental amount for each displacement. In one embodiment, nonlinearly convergent indicator 219 can be configured to traverse portions of content by a logarithmic amount. Further, nonlinearly convergent indicator 219 facilitates determining a target unit of content for a quantity of accepted inputs. As such, any target unit of content 200 can be sufficiently determined within a specific number of key strokes associated with inputs 232 and 234. In one embodiment, the specific number of accepted inputs (e.g., key strokes) can be programmable to modify the rate at which a target unit of content 200 can be found. In a specific embodiment, the rate at which a target unit of content 200 is determined can be a function of the specific number of accepted inputs to reach target 221 (e.g., a number of key strokes) and a number of partitions (not shown) for content 200. In addition, nonlinearly convergent indicator 219 can be configured to obviate the need to use a pointing device to search content 200.

Content search panel 214 can include a scale having a beginning 201b and an end 203b that respectively correspond to the beginning 201a and the end 203a of content 200. Content 200, for example, can be a collection of images of alphabetic characters that constitute a video, whereby each character is shown for a finite amount of time. In one embodiment, nonlinearly convergent indicator 219 is configured to successively reduce the magnitude of the displacement amounts in accordance with a logarithmic function, for each accepted input for input interface 230. Note that in this example, input 232 can be configured to move nonlinearly convergent indicator 219 toward beginning 201b, whereas input 234 can be configured to move the nonlinearly convergent indicator 219 toward end 203b.

To illustrate a nonlinear search mode, consider that the nonlinearly convergent indicator initializes as nonlinearly convergent indicator 219a. At this position, nonlinearly convergent indicator 219a is configured to present character, "M," which is the 13th of 26 characters, as portion of content 212. Next, the user selects input 234 to move nonlinearly convergent indicator 219a by displacement ("d1") 207 to a position for nonlinearly convergent indicator 219b. Responsive to the user again selecting input 234, nonlinearly convergent indicator 219b moves by displacement ("d2") 209 to a position for nonlinearly convergent indicator 219c. Note that successively-accepted inputs reduce the magnitudes of displacement, such as from displacement 207 to displacement 209. The magnitude reduction can be in accordance with a logarithmic function. Lastly shown is the movement of nonlinearly convergent indicator 219c to a position for nonlinearly convergent indicator 219d in response to, for example, activation of input 232. Subsequent accepted inputs, which are not depicted, facilitate the convergence of nonlinearly convergent indicator 219 to target 221. Note that nonlinearly convergent indicators 219a to 219d can represent the same indicator 219, but at different positions along scale 211.

FIG. 2B is a diagram depicting partitions in conjunction with a nonlinearly convergent indicator, according to at least one embodiment of the invention. In nonlinear search mode, content search panel 244 is configured to present, for example, two partitions from which to select for displacing nonlinearly convergent indicator 219. Partition ("1") 216 and partition ("2") 218 respectively operate to partition content 200 (FIG. 2A) to two partitions, each being associated with the same number of content units. One example of a content unit is a second (as measure of time). In response to the selection of an input (e.g., input 234 of FIG. 2A), nonlinearly convergent indicator 219 moves to a position associated with nonlinearly convergent indicator 269 in content search panel 254. As shown, nonlinearly convergent indicator 269 divides partition 218 into partition 256 and partition 258, each of which is associated with the same number of content units. But note that partition 256 and partition 258 each have fewer content units than partition 216 and partition 218. In at least one embodiment, the sizes of subsequent partitions (not shown) decrease for successively-accepted inputs. Referring back to FIG. 2A, content search panel 214 can, as a single panel, include both the content presentation display, such as content portion 212, and nonlinearly convergent indicator 219, according to one embodiment.

As used herein, the term "nonlinearly convergent indicator" refers generally, at least in one embodiment, to an interface component that represents the position of a portion of content relative to positions for other portions of the content, such as between a beginning and an end of the content. In one embodiment, a nonlinearly convergent indicator can represent a length, a distance, a number of content units, and the like. A nonlinearly convergent indicator can be implemented as a slider that moves relative to a scale, according to one embodiment. In another embodiment, a nonlinearly convergent indicator can be implemented as a number representing, for example, a point in time (e.g., a timer), a percentage, a number of content units (e.g., a number of minutes and/or seconds), a number of pages, or the like. In various embodiments, a nonlinearly convergent indicator can be implemented as any representation that indicates a portion in content that can be displaced to another portion in accordance to, for example, a nonlinear function that converges to or on a limiting value. As used herein, the term "content," at least in one embodiment, refers to information and/or material (e.g., multi-media information) presented within an interface in relation to, for example, a web site, a data entry application, such as a software product, a media player, and the like. Content can also include the audio and/or visual presentation of text, such as an electronic document (e.g., a document in Portable Document Format ("PDF")), as well as audio, images, audio/video media, such as Flash® presentations, text, and the like. As used herein, the term "logarithmic" refers generally, at least in one embodiment, to a characteristic that is determined in accordance with or as a result of an exponential-related function, such as an inverse exponential function (i.e., a logarithm function) or a decreasing exponential function, as well as any other nonlinearly convergent function that converges near or to a value that can represent one or more target units of content. For example, a logarithmic amount can be a quantity determined in accordance with an exponential-related function or as a result of such a function.

As used herein, the term "input" refers generally, at least in one embodiment, to a mechanism for accepting or receiving data or a datum, such as a two-state input that has one state that represents an un-activated state (e.g., a normally un-activated state) and another state that represents an activated state. An example of a two-state input is a momentary push button switch. Another example of a two-state input is a voice-activated command that inputs data or a datum in response to a specific sound or word(s) (e.g., "seek left"). As used herein, the term "accepted input" refers generally, at least in one embodiment, to the data or datum generated by an activated input. As such, multiple accepted inputs (e.g., key strokes) can be entered with respect to the same input (e.g., button). As used herein, the term "target" refers generally, at least in one embodiment, to either an object of a nonlinear search or a selected interface component for search for the object. For example, a target content unit and a target portion of content can be objects to which a nonlinear search converges. As another example, a target partition and a target range can be described as selected interface components that are used to determine the object of the search. As used herein, the term "partition" refers generally, at least in one embodiment, to a subset of content units that each can have the same quantity of content units (or, in some cases, different quantities).

Figure 3A:
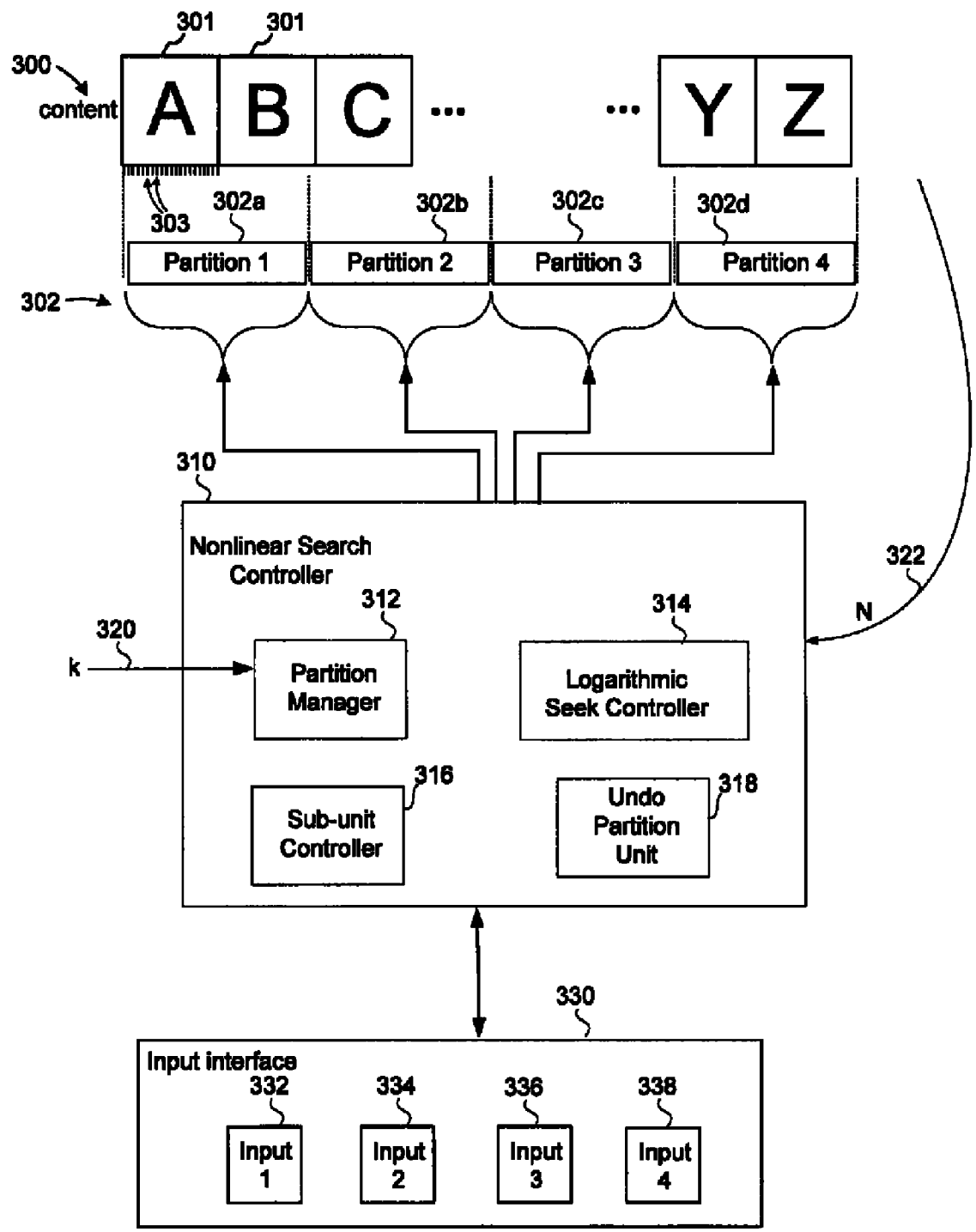
FIG. 3A is a diagram of a nonlinear search controller configured to search content in a manner that converges on a target unit of content, according to at least one embodiment of the invention.

FIG. 3A is a diagram of a nonlinear search controller configured to search content in a manner that converges on a target unit of content, according to at least one embodiment of the invention. In particular, FIG. 3A illustrates a nonlinear search controller 310 that is configured to generate partitions 302 for selection via input interface 330. Nonlinear search controller 310 includes a partition manager 312, a logarithmic seek controller 314, a sub-unit controller 316, and an undo partition unit 318. In operation, nonlinear search controller 310—in whole or in part—is configured to facilitate monitoring a number of inputs for input interface 330 that select a target partition for determining a target content unit, each of the number of the inputs being associated with one of partitions 302. Here, each of partitions 302 has a first partition size that includes a first quantity of content units. In response to the selection of one of partitions 302 as a target partition, a number of second partitions (not shown) for determining the target content unit are generated for presentation on an interface (not shown). The second quantity of content units that constitute a second partition size for the second partitions differs from the first quantity of content units for partitions 302 as a function of a nonlinearly convergent function. In one embodiment, the number of the first and second partitions can be equivalent to the number of inputs 332 to 338 (e.g., four partitions are equivalent to the number of inputs). In one embodiment, each of the number of inputs for input interface 330 can have a one-to-one correspondence to each of partitions 302. But in other embodiments, each of the number of inputs for input interface 330 can have a one-to-many correspondence to each of partitions 302. That is, one input can select more than one partition 302. For example, if one button is used to implement input interface 330, then inputs 332 to 338 can represent the successive activations of the same button during a certain interval of time. Nonlinear search controller 310, in at least one embodiment, can operate to configure the number of inputs from 332 to 328 to facilitate the determination of the target content unit in a specific number of partition selections (e.g., a specific number of key strokes).

Partition manager 312 is configured to partition content 300 into a number of partitions 302, each of which can be associated with an input, such as any of inputs 332 to 338. Further, partition manager 312 can be configured to size partitions 302a to 302d in a manner that decreases the amount of content units for successively-accepted inputs. Further, partition manager 312 is configured to generate "k" number of partitions 302, which, in this example, include four partitions 302a to 302d. In one embodiment, a number for "k" is selected so that nonlinear search controller 310 can determine one or more target content units for a quantity of accepted inputs. In some instances, a user or another entity can provide number ("k") 320 to partition manager 312 to generate the appropriate number of partitions 302. Further, partition manager 312 can form associations between inputs in input interface 330 with partitions 302. For example, input ("1") 332, input ("2") 334, input ("3") 336, and input ("4") 338 can be configured to select partition ("1") 302a, partition ("2") 302b, partition ("3") 302c, and partition ("4") 302d, respectively.

Logarithmic seek controller 314 is configured to, among other things, to reduce the first quantity of content units for partitions 302 to the second quantity of content units in accordance with or as a result of operation of an exponential function, including the inverse of the exponential function (i.e., a logarithmic function). In at least one embodiment, logarithmic seek controller 314 can operate to determine a specific number of partition selections (e.g., a number of key strokes) to sufficiently find one or more target content units in content 300. In a specific embodiment, logarithmic seek controller 314 can be configured to displace a nonlinearly convergent indicator (not shown) by amounts that nonlinearly approach a target portion of content in an approximate number of accepted inputs for inputs 332 to 338, the approximate number of accepted inputs being determined by the following expression:

$$NI \approx O(\log_k(n)) \qquad \text{Equation 1}$$

where "NI" represents the quantity of the accepted inputs, such as the number of key strokes to determine the target, "O" indicates order to successive selections of partitions, "k" represents a number of partitions 302 associated with the quantity of inputs 332 to 328, and "n" represents an aggregate number 322 of units or portions of content 300. Further, Equation 1 can be modified to calculate values of k and n.

Sub-unit controller 316 is configured to modify nonlinearly convergent search parameters for nonlinear search controller 310 when searching for target sub-units of content within a determined target content unit. For example, consider that if each character of content 300 represents a unit 301 of content, then there are 26 units of content 300 (i.e., "n" is equivalent to 26). Further, consider that each unit 301 of content is composed of sub-units of content 303 that each corresponds to one second of playback, for example. If there are 60 seconds for each unit of content, then sub-unit controller 316 is configured to modify nonlinearly convergent search parameters for Equation 1. Namely, sub-unit controller 316 can change "n" from 26 to 60, and k from 4 to any number (including 4) to determine a number of key strokes to search for a second (i.e., $\frac{1}{60}^{th}$ of a minute) of content within unit 301. Sub-unit controller 316 can continue to determine other sub-units of content, such as a video frame within sub-unit 303.

Undo partition unit 316 is configured to undo either the sizing of partitions 302 or the displacement of the nonlinearly convergent indicator (not shown). For example, consider that a user selects input 336, which, in turn, selects partition 302c. In response, additional partitions are generated for that partition 302c. But if the user wishes to refine the search to the partition 302d prior to the last accepted input, then the user enters an undo input. The undo input can be one of inputs 332 to 338, or any other input not shown. Thereafter, the user can select input 338 to continue searching in partition 302d.

Figure 3B:
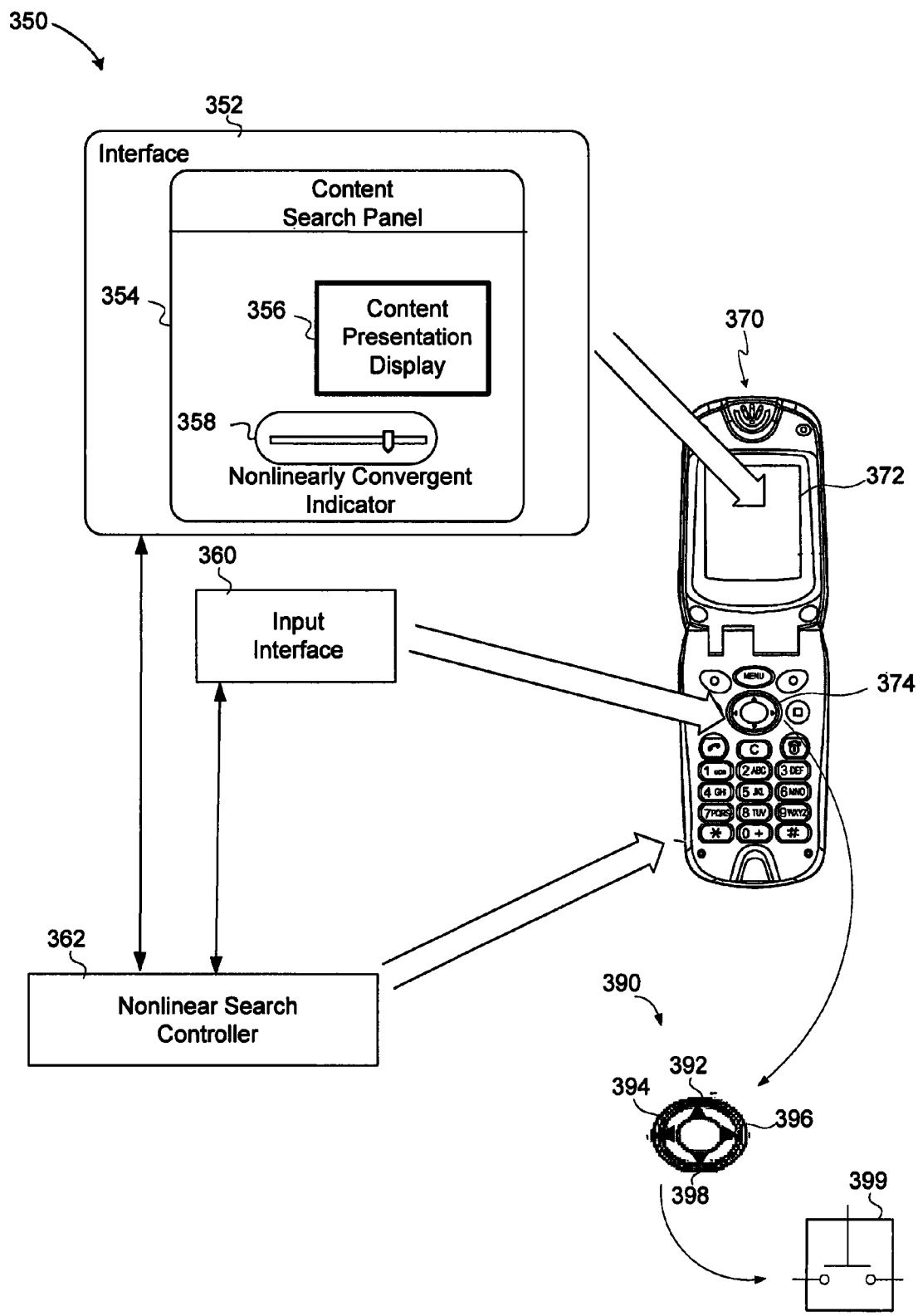
FIG. 3B is a diagram of an interface implementing a nonlinear search controller in a hand-held device, according to at least one embodiment of the invention.

FIG. 3B is a diagram 350 of an interface implementing a nonlinear search controller in a hand-held device, according to at least one embodiment of the invention. Hand-held device 370 is configured to include an interface 372 for displaying content (or representations thereof) in relation to a nonlinearly convergent indicator, and one or more user inputs 374. Interface 372 can be used to nonlinearly search for a target content unit. In the example shown, interface 352 can be implemented as interface 372, and can be configured to implement a content search panel 354. Here, content search panel 354 includes a content presentation display 356 and nonlinearly convergent indicator 358. Further, hand-held device 370 can include a nonlinear search controller 362 that is configured to coordinate the functionalities of interface 352 and input interface 360 to perform nonlinearly convergent content searches. In one embodiment, input interface 360 can be implemented as input key 390 composed of four input keys: input button 392, input button 394, input button 396, and input button 398. In a specific embodiment, input buttons 392 to 398 can each be implemented as momentary push button 399. In some embodiments, content presentation display 356 can be optional, especially when the content presented is audio, sound and/or voice-related content. In some instances, content presentation display 356 can present metadata about the audio.

Figure 4A:
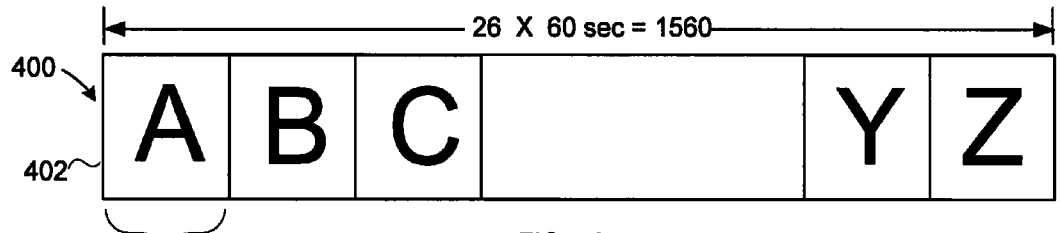
FIGS. 4A to 4F illustrate an example of the use of a nonlinearly convergent indicator to search through content, according to one embodiment of the invention.
Figure 4B:
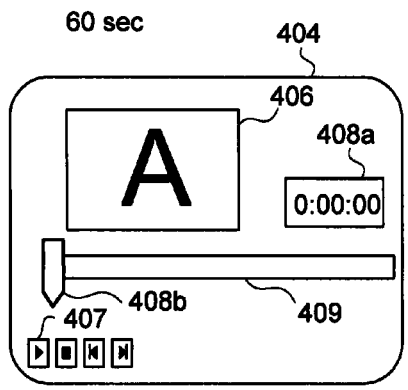
Figure 4C:
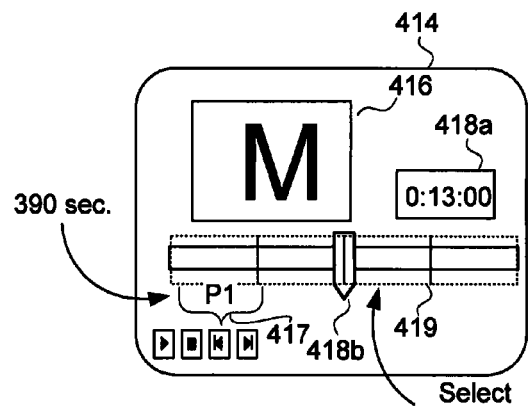

FIGS. 4A to 4F illustrate examples of the use of a nonlinearly convergent indicator to search through content, according to one embodiment of the invention. FIG. 4A depicts content 400 consisting of 26 alphabetic characters, each of which is presented for 60 seconds as a content unit 402. As such, content 400 can be presented as a video that is 1560 seconds in length. FIG. 4B depicts content search panel 404 into which content 400 has been loaded and is ready to play (e.g., in response to a play button 407 being selected). Here, the beginning of content 400 (e.g., character A) is presented in display 406, which corresponds to the position of nonlinearly convergent indicator 408b relative to scale 409. Note, too, that timer 408b—as another nonlinearly convergent indicator—can be implemented to show the relative point of time (e.g., zero hours, zero minutes, and zero seconds) for the portion of content presented in display 406. FIG. 4C depicts a content search panel 414 showing the initialization of nonlinearly converging content searches. Here, nonlinearly convergent indicator 418b can be initialized at, for example, the middle of content 400. As "M" is near the half-way point (i.e., at or near the 13$^{th}$ letter), the character M is presented in display 416. Timer 418a shows 13 minutes. In this example, content search panel 414 partitions the content into four partitions ("P1") 417 of 390 seconds, one of which is shown as partition 419. Next, partition 419 is selected.

Figure 4D:
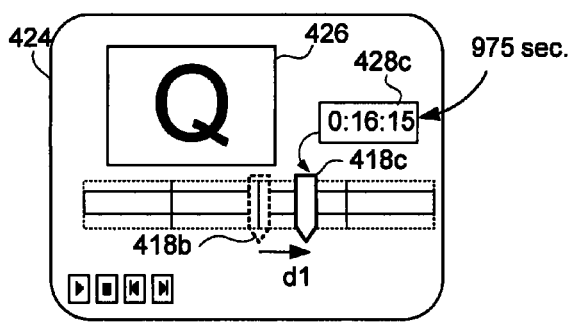
Figure 4E:
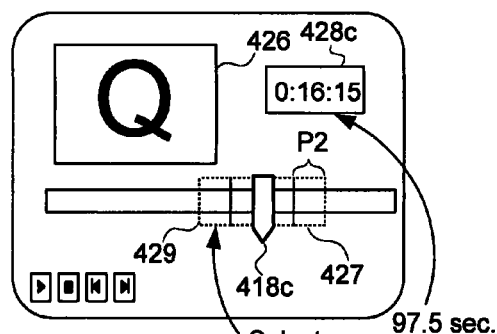
Figure 4F:
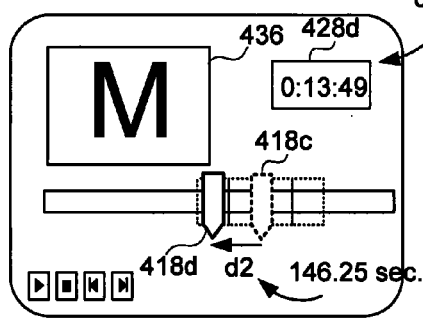

FIG. 4D depicts a content search panel 424 showing the displacement from a first position for nonlinearly convergent indicator 418b to a second position for nonlinearly convergent indicator 418c. The amount of displacement ("d1") can be determined, for example, in accordance with a logarithmic function. Note that the position of nonlinearly convergent indicator 418c is at 975 seconds (i.e., equivalent to the time shown in timer 428c, which is 16 minutes and 15 seconds). The character "Q" is presented in display 426. FIG. 4E shows the generation of four more partitions ("P2") 427 that are optionally centered about the position of nonlinearly convergent indicator 418c. Next, consider that partition 429 is selected. FIG. 4F illustrates again the displacement from the second position for nonlinearly convergent indicator 418c to a third position for nonlinearly convergent indicator 418d. The displacement, "d2," is approximately 146.25 seconds toward the beginning of the content. Here, timer 428d indicates that the portion of content shown in display 436 is positioned at 13 minutes and 49 seconds into content 400. Note that the above-described decreases in displacement can continue until the target content unit is determined (not shown).

Figure 4G:
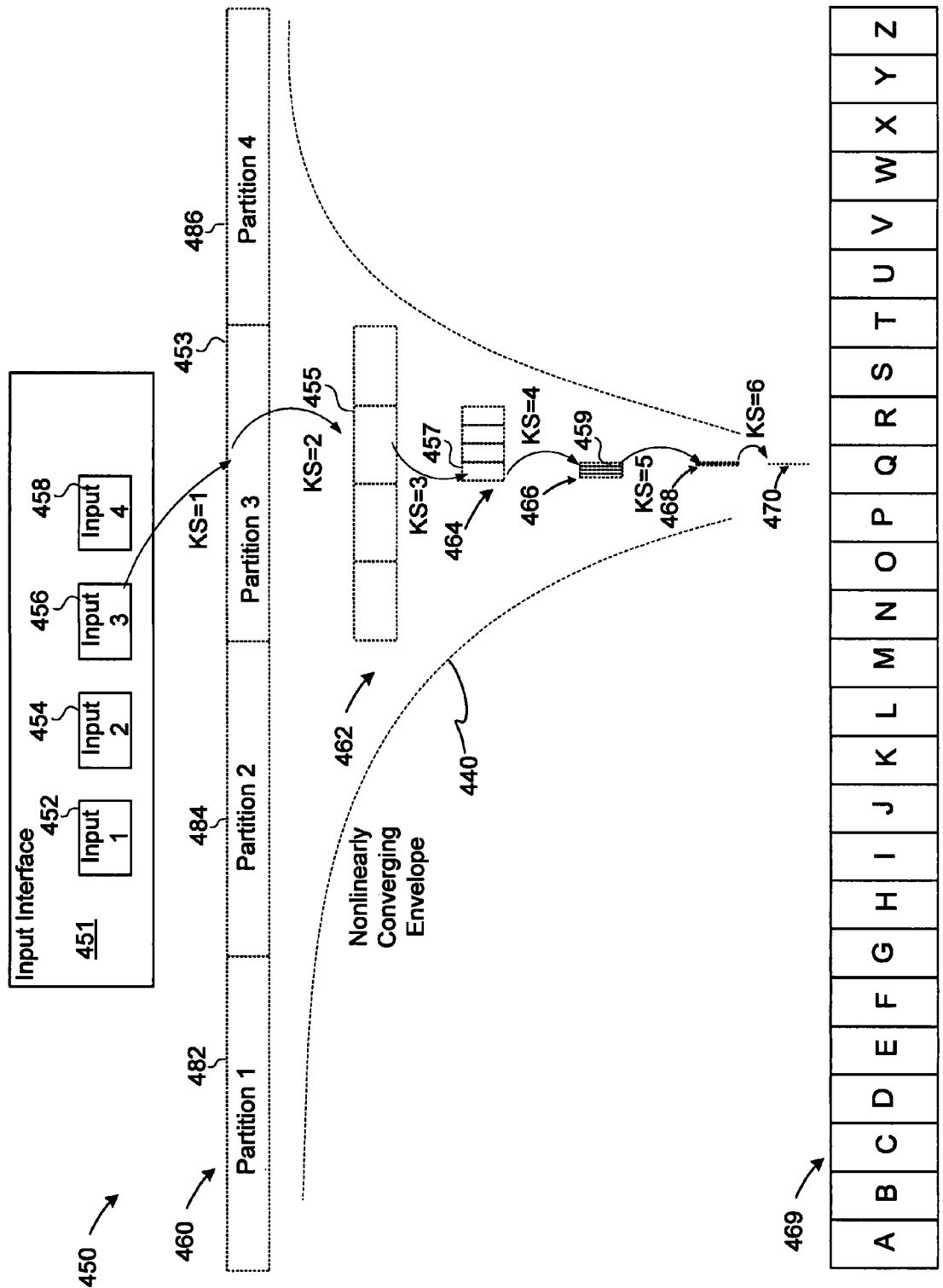
FIG. 4G depicts the resizing of partitions for convergence on a target content unit within a nonlinearly converging envelope, according to one embodiment of the invention.

FIG. 4G depicts the resizing of partitions for convergence on a target content unit within a nonlinearly converging envelope, according to one embodiment of the invention. As shown, an input interface 451 includes four inputs, such as input ("1") 452, input ("2") 454, input ("3") 456, and input ("4") 458 that respectively are configured to select partition ("1") 482, partition ("2") 484, partition ("3") 453, and partition ("4") 458 for successively formed sets of partitions. For successive inputs into input interface 451, a nonlinearly converging envelope 440 defines the resizing of sequential sets of partitions formed to search for a target content unit. Nonlinearly converging envelope 440 can be a function of or a result of determining the number of accepted inputs to find the target content unit in content 469. Namely, nonlinearly converging envelope 440 can be determined—in whole or in part—by Equation 1 in which "k" is four and "n" is 1560 to yield 5.3 as the quantity of accepted inputs (e.g., the number of key strokes, "KS") to reach the search result. As such, it takes 5.3 key strokes to determine a target content unit in content 469.

To illustrate, consider that nonlinear search mode initializes by generating a first set of partitions 460 Activation of input 456, as the first key stroke ("KS=1"), selects partition 453. A second set of partitions 462 are formed. Next, consider that the third partition 455 is selected with the second key stroke, KS=2. This forms a third set of partitions 464. A first partition 457 is next selected with the third key stroke, KS=3, which, in turn, generates a fourth set of partitions 466. Responsive to a fourth key stroke (i.e., KS=4) to select a fourth partition 459, a fifth set of partitions 468 are created. Since it takes approximately 5.3 key strokes to reach a target content unit, a sixth key stroke (i.e., KS=6) can select the target content unit 470. Note that an undo partition unit can be configured to reverse the activation of a key stroke to regenerate, for example, the fourth set of partitions 466 subsequent to generating the fifth set of partitions 468, thereby going from the 5$^{th}$ key stroke back to the 4$^{th}$ key stoke.

Figure 4H:
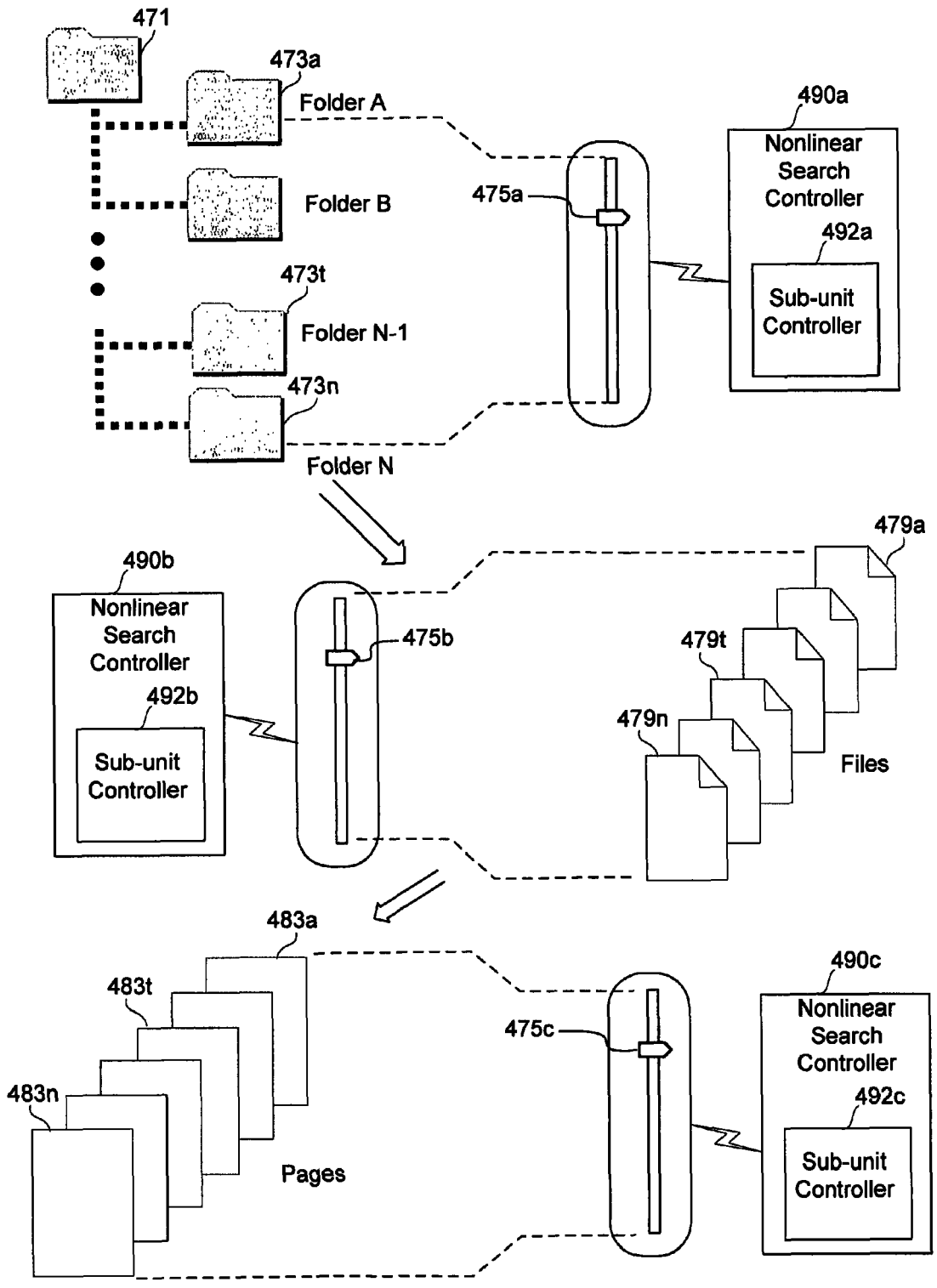
FIG. 4H illustrates the functionality of a sub-unit controller configured to modify nonlinearly convergent search parameters for a nonlinear search controller when searching for target sub-units of content, according to one embodiment of the invention.

FIG. 4H illustrates the functionality of a sub-unit controller configured to modify nonlinearly convergent search parameters for a nonlinear search controller when searching for target sub-units of content, according to one embodiment of the invention. Consider that a user searches a superset of content, such as main folder 471, to find a specific document page. In performing a nonlinear content search, nonlinear search controller 490a is configured to displace nonlinearly convergent indicator 475a to select any content from folder ("Folder A") 473a to folder ("Folder N") 473n. Consider that a user's search converges on folder ("Folder N-1") 473t as the target content unit. Further, the user might wish to determine a specific file within folder 473t. As such, sub-unit controller 492a is configured to modify nonlinearly convergent search parameters, such as the aggregate number of files (e.g., "n" for Equation 1), the number of partitions (not shown) as "k," etc., for nonlinear search controller 490b.

Consequently, sub-unit controller 492b can operate to modify the amounts of displacement for nonlinearly convergent indicator 475b. Next, consider that a user's search of files 479a to 479n converges on file 479t as the target content sub-unit. When the user continues the search of file 479t to determine a specific document pge, nonlinear search controller 490c and sub-unit controller 492c operate as previously described. Thus, user can implement nonlinearly convergent indicator 475c to determine page 483t among other pages ranging from page 483a to page 483n by using an additional set of modified search parameters. Page 483t, is therefore, a target content sub-unit (e.g., in the second degree). Note that the sub-unit controller 492c can operate to enable the user to find a particular word on page 483t (not shown) or any other characteristic.

Figure 5:
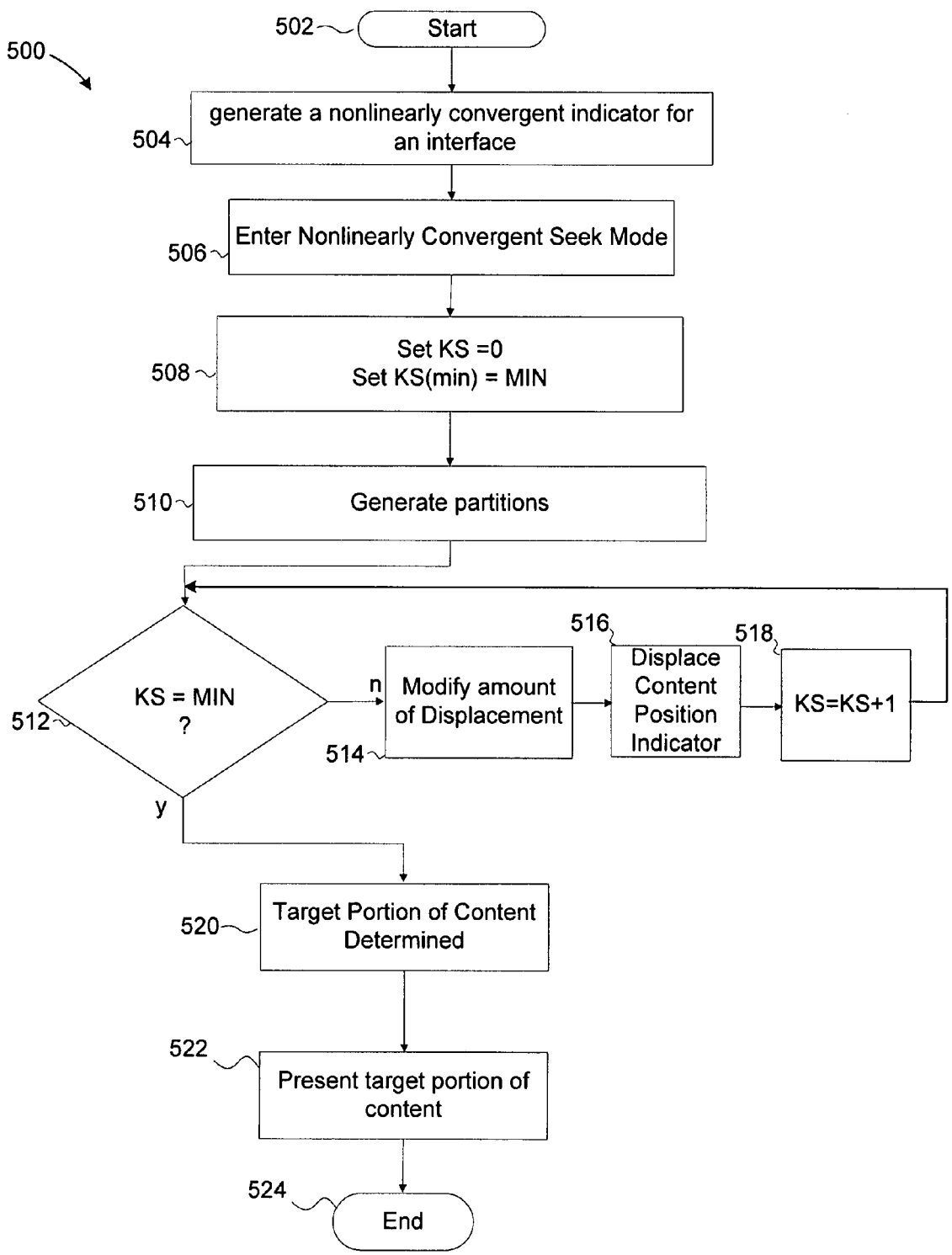
FIG. 5 is a flow diagram depicting one example of a method for nonlinearly searching content, according to one embodiment of the invention.

FIG. 5 is a flow diagram depicting one example of a method for nonlinearly searching content, according to one embodiment of the invention. As shown, flow 500 begins at 502, with an interface, a processor, an application and/or logic, generating a content position indicator at 504 that is configured to nonlinearly seek content upon accepting nonlinearly convergent seek mode at 506. Flow 500 identifies the number of accepted inputs and/or key strokes in view of a minimum quantity of, for example, key strokes (i.e., "MIN") set forth at 508. At 510, flow 500 generates a number of partitions to determine a target content unit within the minimum quantity of key strokes. Flow 500 monitors the number of pending key strokes at 512, and then determines whether that number of pending key strokes is equal to, or surpasses, the minimum quantity. If not, then flow 500 continues to 514 at which the amount of displacement for the nonlinearly convergent position indicator can be modified so at to converge on a target content unit. At 516, the nonlinearly convergent position indicator is displaced. At 518, a variable representing the number of key strokes is incremented. Flow 500 continues from 512 to 518 until a sufficient number of key strokes are implemented, in which case flow continues to 520. The target content portion or unit can be determined at 520. At 522, the target portion or unit of content can be presented as a search result. Flow 500 terminates at 524.

Figure 6:
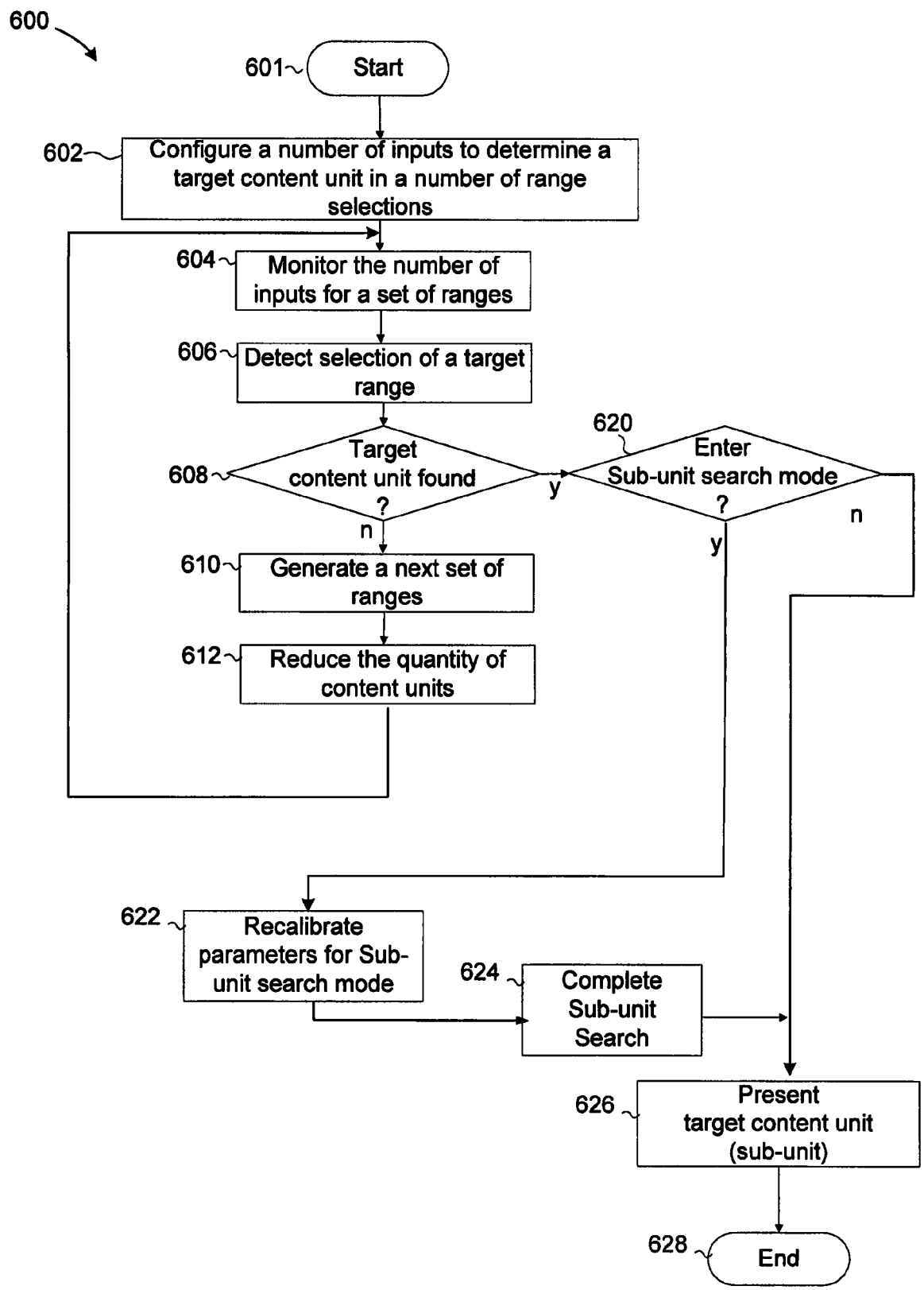
FIG. 6 is a flow diagram depicting another example of a method for nonlinearly searching content, according to another embodiment of the invention.

FIG. 6 is a flow diagram depicting another example of a method for nonlinearly searching content, according to another embodiment of the invention. As shown, flow 600 begins at 601, with an interface, a processor, an application and/or logic, configuring a number of inputs to determine a target content unit within a number of partitions selections. Flow 600 monitors the number of inputs at 604 for a set of ranges, which, in at least one embodiment, is equivalent to a set of partitions. At 606, flow 600 detects the selection of a target range. A determination is made at 608 whether the target content unit is found. If not, flow 600 then continues to 610 at which a next set of ranges are generated, each of which includes a reduced quantity of content units at 612. Flow 600 performs 604 to 612, or any variant thereof, until the target content unit is found, at which another determination is made. In particular, flow 600 determines whether to enter sub-unit search mode at 620 to find a target content sub-unit. If so, flow 600 continues to 622 at which the nonlinearly convergent search parameters can be recalibrated, followed by a nonlinearly convergent content search using the recalibrated search parameters at 624. If not, flow 600 then continues to 626 at which the target unit of content can be presented. Flow 600 terminates at 628.

Figure 7A:
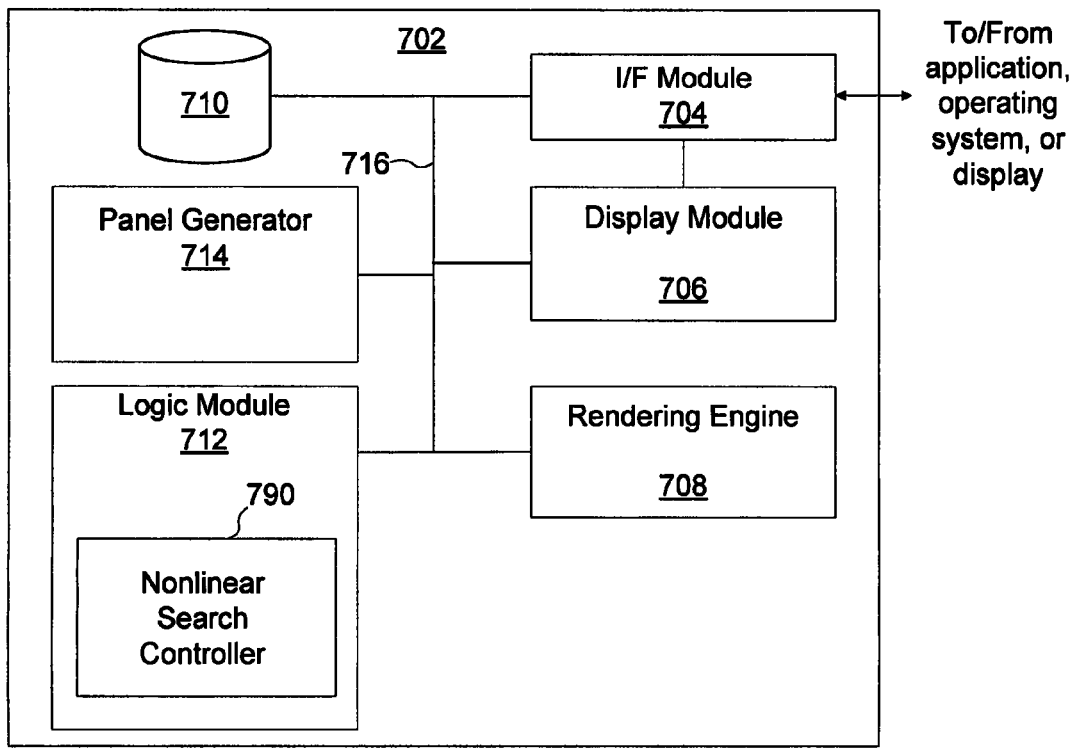
FIGS. 7A and 7B illustrate examples of panel presentation applications for implementing content search panels that include a nonlinearly convergent indicator, according to various embodiments of the invention.

FIG. 7A illustrates an example of a panel presentation application for implementing a content search panel that includes a nonlinearly convergent indicator, according to various embodiments of the invention. In at least one embodiment, a nonlinearly convergent indicator and a content presentation display can be implemented in a panel, such as a single panel. Here, application 702 includes interface ("I/F") module 704, display module 706, rendering engine 708, repository 710, logic module 712, panel generator 714, and data bus 716. In some examples, the number and type of elements shown and described may be varied and are not limited to the descriptions provided. In some examples, the above-described elements can be implemented as part, component, or module of application 702. As an example, application 702 can be implemented to include either a web-based form or an electronic form as part of a software product, and can have content input field functionality as described herein. Logic module 712 can be implemented as software, hardware, circuitry, or a combination thereof to implement control logic for the described techniques for panel presentation.

Figure 9:
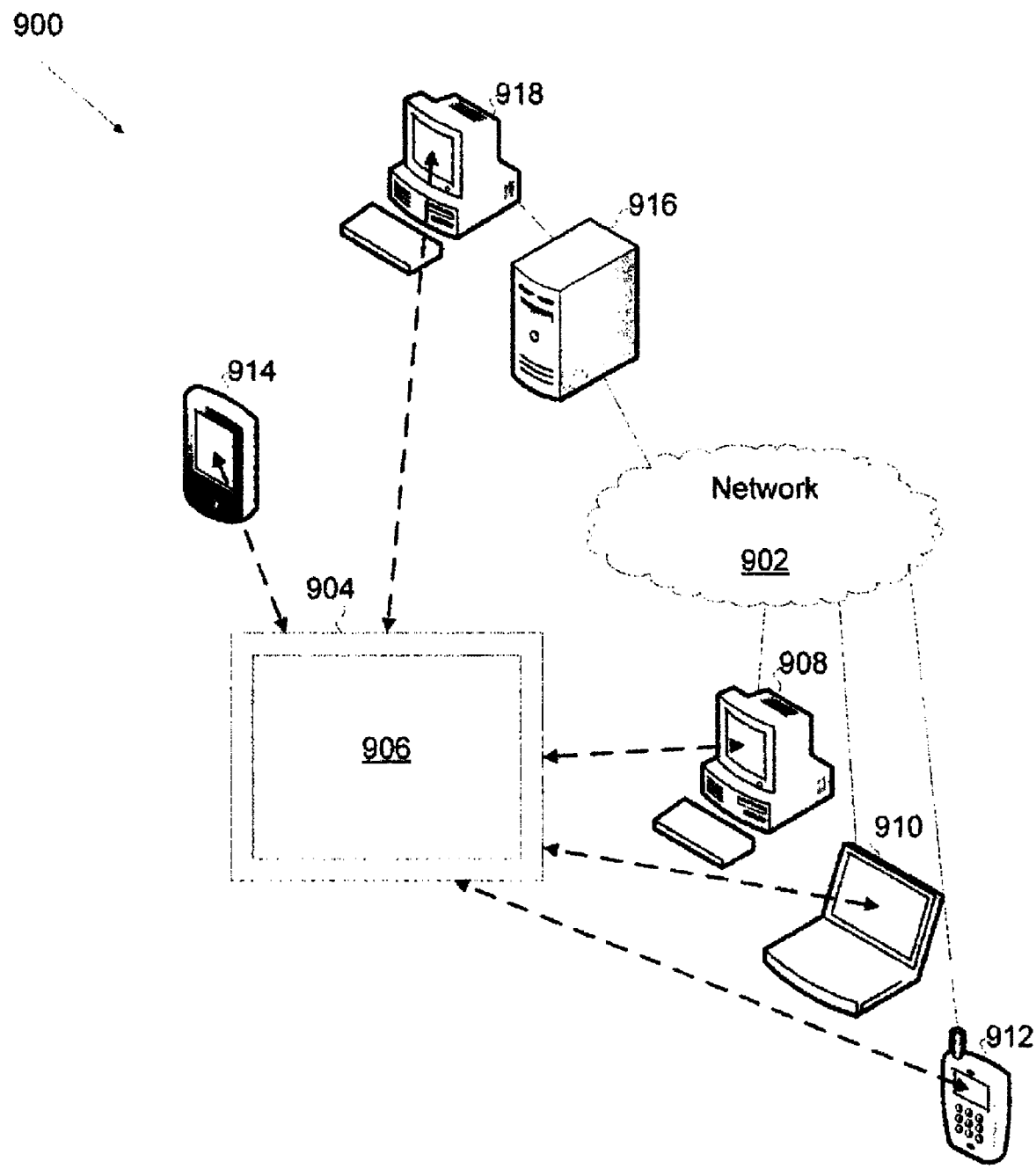
FIG. 9 illustrates an example of a panel presentation system for implementing nonlinearly converging content searches, according to an embodiment of the invention.

In some examples, logic module 712 can be configured to control panel generator 714 to form content search panels that include a nonlinearly convergent indicator. Rendering engine 708 can be configured to operate as a layout engine for web pages, for example, to manipulate both content (e.g., as expressed in or including HTML, XML, image files, etc.) and formatting information (e.g., as expressed in or including CSS, XSL, etc.) for rendering the data or information as one or more panels on interface 906 (FIG. 9). Interface module 704 can exchange panel presentation data, including content data, image data, audio data, as well as other data, between application 702 and another application (e.g., a host, client, web services-based, distributed (i.e., enterprise), application programming interface ("API"), operating system, program, procedure or others) that can use data and information generated from panel generator 714 to render presented panels on a display screen. In other examples, the above-described techniques and elements can be varied in design, implementation, and function and are not limited to the descriptions provided. In one embodiment, logic module 712 can include a nonlinear search controller 790 that is configured to include structure and/or functionality similar to previously-described nonlinear search controllers.

Figure 7B:
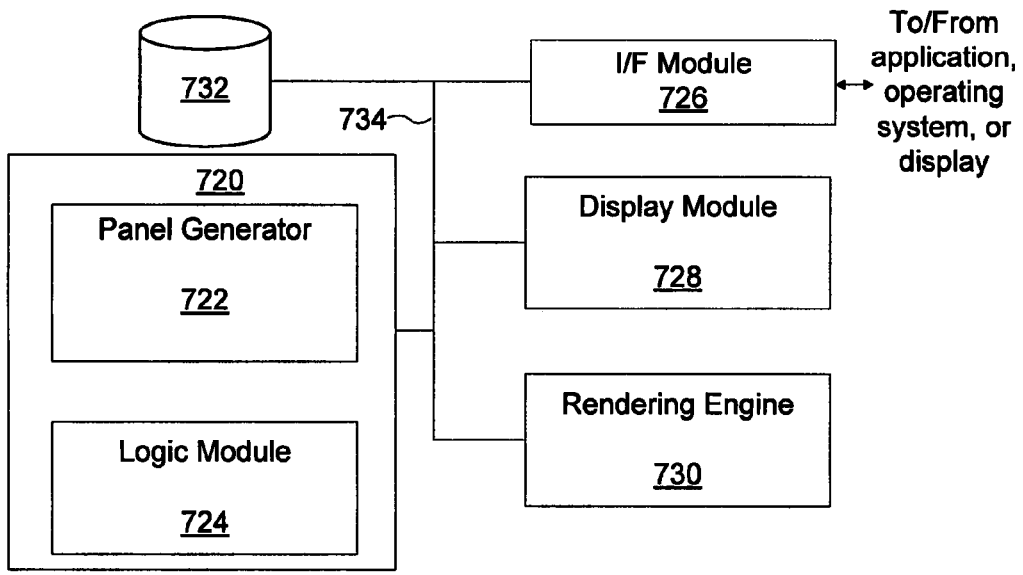

FIG. 7B illustrates an alternative example of a panel presentation application for implementing a content search panel that includes a nonlinearly convergent indicator, according to one embodiment of the invention. Here, application 720 includes panel generator 722 and logic module 724, which can have equivalent functionality as 712 of FIG. 7A. Further, application 720 is shown in data communication with interface ("I/F") module 726, display module 728, rendering engine 730, and repository 732. Data bus 734 can be configured to send or receive data among application 720, I/F module 726, display module 728, rendering engine 730, and repository 732. In other examples, more, fewer or different elements can be used and implemented without limitation to the examples provided above.

In some examples, logic module 724 and panel generator 722 can be implemented as part of application 720, which can be implemented separately from other functional components or modules, such as interface module 726, display module 728, rendering module 730, and repository 732. Data bus 734 can be implemented to communicate data over a given port between application 720 and interface module 726, display module 728, rendering module 730, and repository 732. In other words, application 720 can be implemented as a standalone application or as a component (i.e., module) of another application. Data or information (e.g., nonlinearly convergent search parameters, displacement amounts, logarithmic amounts, accepted inputs, partitions sizes, and the like) associated with a panel can be stored in repository 732, which can be implemented using a database, data store, data warehouse, or any other type of data repository or structure. In other examples, more, fewer, or different modules can be used to implement the described techniques for panel presentation and are not limited to those provided.

Figure 8:
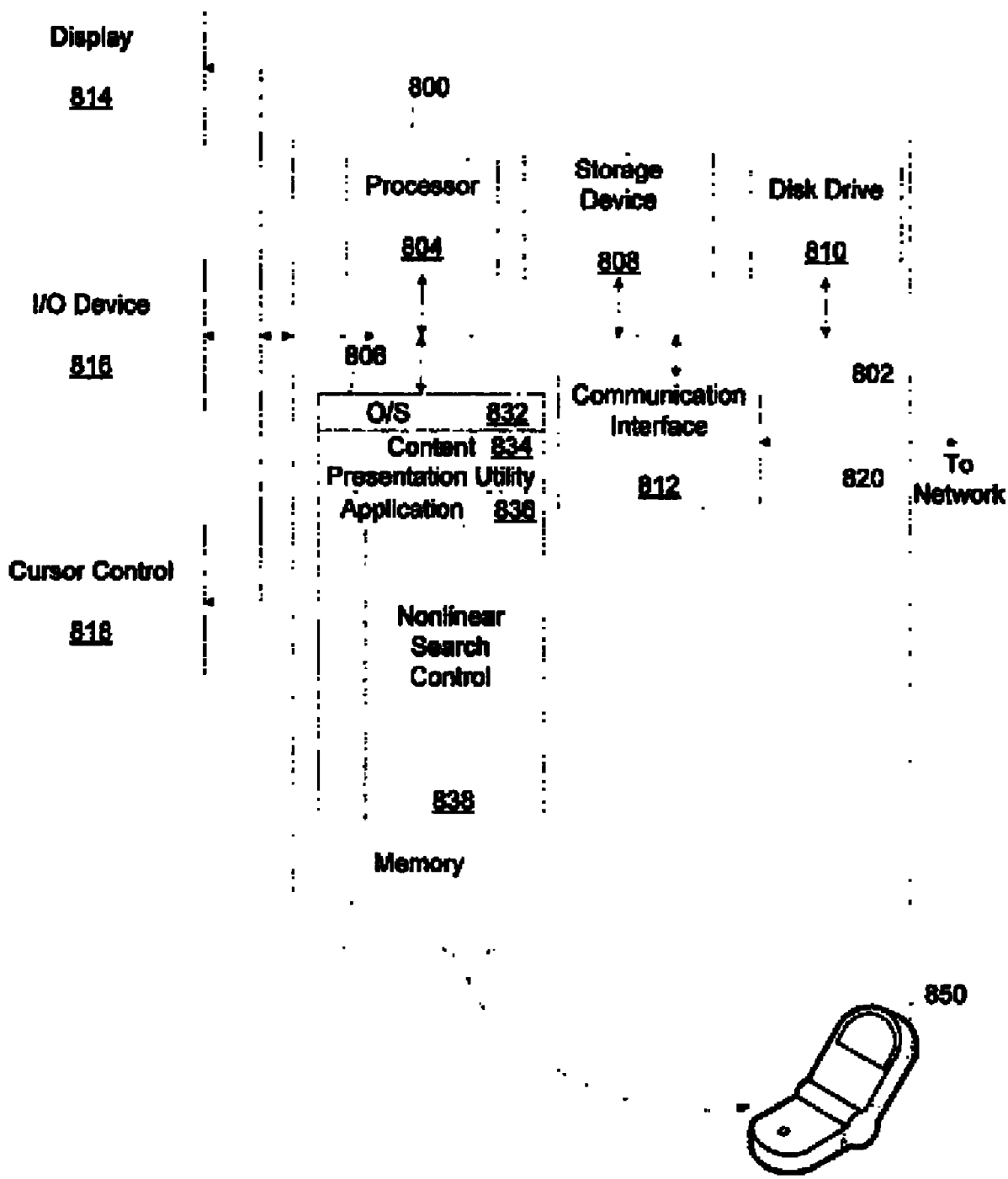
FIG. 8 illustrates an exemplary computer system suitable for performing nonlinearly converging content searches using a nonlinear search controller and indicator, according to at least one embodiment of the invention.

FIG. 8 illustrates an exemplary computer system suitable for performing nonlinearly converging content searches using a nonlinear search controller and indicator for an interface, according to at least one embodiment of the invention. In some examples, computer system 800 can be used to implement computer programs, applications, methods, processes, or other software to perform the above-described techniques and to realize the structures described herein. Computer system 800 includes a bus 802 or other communication mechanism for communicating information, which interconnects subsystems and devices, such as processor 804, system memory ("memory") 806, storage device 808 (e.g., ROM), disk drive 810 (e.g., magnetic or optical), communication interface 812 (e.g., modem or Ethernet card), display 814 (e.g., CRT or LCD), input device 816 (e.g., keyboard), and cursor control 818 (e.g., mouse or trackball). In one embodiment, cursor control 818 can select a content input field and input device 816 can include a user input interface, such as a direction key, whereby both cursor control 818 and input device 816 can collaborate to capture and modify content.

According to some examples, computer system 800 performs specific operations in which processor 804 executes one or more sequences of one or more instructions stored in system memory 806. Such instructions can be read into system memory 806 from another computer readable medium, such as static storage device 808 or disk drive 810. In some examples, hard-wired circuitry can be used in place of or in combination with software instructions for implementation. In the example shown, system memory 806 includes modules of executable instructions for implementing an operation system ("O/S") 832, a content presentation utility module 834, an application 836, and a nonlinearly convergent content search control module 838. Content presentation utility module 834 includes instructions for providing content presentation functionality, such as a media player, a word processing application, a photo album, etc. Application 836 includes additional instructions to integrate nonlinearly converging content searches with content presentation utility module 834. Further, application 836 can implement instructions to perform searching using a nonlinearly convergent search control module 838.

The term "computer readable medium" refers, at least in one embodiment, to any medium that participates in providing instructions to processor 804 for execution. Such a medium can take many forms, including but not limited to, non-volatile media, volatile media, and transmission media. Non-volatile media includes, for example, optical or magnetic disks, such as disk drive 810. Volatile media includes dynamic memory, such as system memory 806. Transmission media includes coaxial cables, copper wire, and fiber optics, including wires that comprise bus 802. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions can be performed by a single computer system 800. According to some examples, two or more computer systems 800 coupled by communication link 820 (e.g., LAN, PSTN, or wireless network) can perform the sequence of instructions in coordination with one another. Computer system 800 can transmit and receive messages, data, and instructions, including program, i.e., application code, through communication link 820 and communication interface 812. Received program code can be executed by processor 804 as it is received, and/or stored in disk drive 810, or other non-volatile storage for later execution. In one embodiment, system 800 is implemented as a hand-held device, such as a mobile phone 850. But in other embodiments, system 800 can be implemented as a personal computer (i.e., a desk top computer) or any other computing device.

FIG. 9 illustrates an example of a panel presentation system for performing nonlinear content searches, according to various embodiment of the invention. Here, system 900 includes network 902, display environment 904, interface 906, which can be presented on devices such as computer 908, notebook computer ("notebook" or "laptop") 910, smart phone 912, personal digital assistant ("PDA") 914, server 916, and administrator computer 918. In other examples, the number and type of devices can be varied and are not limited to those shown and described.

In some examples, one or more panels for creating electronic documents can be presented on interface 906, which can be an interface for an application such as a web browsing program, Internet content portal, client or desktop application for any purpose. Interface 906, in some embodiments, can include UIs for stand-alone video players, including a DVD-player UI. Panels can be used to provide additional or supplemental information that can be contextually relevant to another panel presented in interface 906. Computer 908, notebook computer ("notebook" or "laptop") 910, smart phone 912, personal digital assistant ("PDA") 914, server 916, and administrator computer 918 can provide content data for rendering content as well as other data, which can be implemented to generate, for example, an electronic form and content input field in interface 906. In some cases, an operating system installed on computer 908 can communicate (i.e., via an application programming interface ("API")) content data and/or other related data to another application installed on computer 908 to render (i.e., interpreting data and information to draw or display the content in an interface) one or more panels presented in interface 906. In some examples, different types of panels can be rendered in interface 906. In one embodiment, interface 906 can include any number and/or any type of display environments, such as CRT and LCD displays. Note that the above-described system and elements can be varied and are not limited to the descriptions or examples provided.

In at least some of the embodiments of the invention, the structures and/or functions of any of the above-described interfaces and panels can be implemented in software, hardware, firmware, circuitry, or a combination thereof. Note that the structures and constituent elements shown in FIGS. 7A to 9, as well as their functionality, can be aggregated with one or more other structures or elements. Alternatively, the elements and their functionality can be subdivided into constituent sub-elements, if any. As software, the above-described described techniques can be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment can readily be interchanged with other embodiments.

Thus, the foregoing descriptions of specific embodiments of the invention are presented for purposes of illustration and description. They are not intended to be exhaustive or to limit the invention to the precise forms disclosed; many alternatives, modifications, equivalents, and variations are possible in view of the above teachings. For the purpose of clarity, technical material that is known in the technical fields related to the embodiments has not been described in detail to avoid unnecessarily obscuring the description. Thus, the various embodiments can be modified within the scope and equivalents of the appended claims. Further, the embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the present invention; rather any specific embodiment can provide one or more of the advantages discussed above. In the claims, elements and/or operations do not imply any particular order of operation, unless explicitly stated in the claims. It is intended that the following claims and their equivalents define the scope of the invention.

What is claimed is:

1. A method comprising:
   generating for an interface:
      a nonlinearly convergent indicator configured to represent a position for a portion of content relative to positions for other portions of the content;
   displacing the nonlinearly convergent indicator by a nonlinear amount from the position to a next position for a next portion of content; and
   presenting the next portion of content.

2. The method of claim 1 wherein displacing the nonlinearly convergent indicator further comprises:
   displacing the nonlinearly convergent indicator without a pointing device.

3. The method of claim 1 further comprising:
   displacing the nonlinearly convergent indicator by subsequent nonlinear amounts that cause the nonlinearly convergent indicator to converge to a target portion of content.

4. The method of claim 1 wherein displacing the nonlinearly convergent indicator by the nonlinear amount further comprises:
   displacing the nonlinearly convergent indicator by a logarithmic amount.

5. The method of claim 1 further comprising:
   accepting a quantity of inputs to form a quantity of accepted inputs in a sequence that successively reduces the magnitude of the nonlinear amounts,
   wherein the quantity of the accepted inputs is sufficient to determine the target portion of the content.

6. The method of claim 5 wherein accepting the quantity of the inputs further comprises:
   implementing a number of key strokes equivalent to the quantity of the accepted inputs.

7. The method of claim 5 wherein accepting the quantity of inputs further comprises:
   accepting one state of a two-state input for each of the inputs,
   wherein the two-state input is associated within a partition that decreases in size for successive activations of two-state inputs.

8. The method of claim 7 wherein accepting the one state of the two-state input further comprises:
   implementing a momentary push button as the two-state input.

9. The method of claim 1 wherein displacing the nonlinearly convergent indicator further comprises:
   displacing the nonlinearly convergent indicator by amounts that nonlinearly approach a target portion of content in an approximate number of a quantity of the inputs, the approximate number of the quantity of the inputs being determined by the following expression:

$$NI \sim O(\log_k(n)),$$

where NI represents the quantity of the inputs, O indicates order, k represents a number of partitions associated with the quantity of inputs, and n represents an aggregate number of portions of the content.

10. The method of claim 1 further comprising:
    partitioning the content into a number of partitions, each of which is associated with an input; and
    sizing the partitions to decrease for successive accepted inputs.

11. The method of claim 1 further comprising:
    undoing the displacement of the nonlinearly convergent indicator.

12. A hand-held device comprising:
    a nonlinearly convergent indicator configured to represent a position for a portion of content in a partition relative to positions for other portions of the content in other partitions;
    a subset of input keys to select the partition; and
    a logarithmic seek controller configured to:
       displace the nonlinearly convergent indicator by sequentially decreasing logarithmic amounts to seek a target portion of the content in an approximate number of selections of the subset of the input keys.

13. A system comprising:
    a memory configured to store instructions and data associated with displacing a nonlinearly convergent indicator for an interface; and
    a processor configured to:
       generate for an interface:
          the nonlinearly convergent indicator configured to represent a position for a portion of content relative to positions for other portions of the content;
          displace the nonlinearly convergent indicator by a logarithmic amount from the position to a next position for a next portion of content; and
          present the next portion of content.

14. A non-transitory computer readable medium comprising executable instructions to:
    generate for an interface:
       a nonlinearly convergent indicator configured to represent a position for a portion of content relative to positions for other portions of the content;
    displace the nonlinearly convergent indicator by a nonlinear amount from the position to a next position for a next portion of content; and
    present the next portion of content.

\* \* \* \* \*